US009952625B2

(12) United States Patent
Lee et al.

(10) Patent No.: US 9,952,625 B2
(45) Date of Patent: Apr. 24, 2018

(54) TOUCH PANEL AND A MANUFACTURING METHOD THEREOF

(71) Applicant: TPK Touch Solutions (Xiamen) Inc., Xiamen (CN)

(72) Inventors: Yuh-Wen Lee, Zhubei (TW); Xianbin Xu, Xiamen (CN); Keming Ruan, Ningde (CN); Qiong Yuan, Xinyu (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 520 days.

(21) Appl. No.: 13/717,667

(22) Filed: Dec. 17, 2012

(65) Prior Publication Data

US 2014/0168099 A1 Jun. 19, 2014
US 2017/0003715 A9 Jan. 5, 2017

(30) Foreign Application Priority Data

Dec. 24, 2011 (CN) .......................... 2011 1 0455536

(51) Int. Cl.
*G06F 1/16* (2006.01)
*G06F 3/044* (2006.01)
*G06F 3/0354* (2013.01)

(52) U.S. Cl.
CPC ........ *G06F 1/1643* (2013.01); *G06F 3/03547* (2013.01); *G06F 3/044* (2013.01)

(58) Field of Classification Search
CPC ........ G06F 3/041; G06F 3/044; G06F 1/1643; G06F 3/03547
USPC .......................................................... 345/173
See application file for complete search history.

(56) References Cited

U.S. PATENT DOCUMENTS

| 5,286,417 | A | * | 2/1994 | Mahmoud | ................ | H01R 4/04 |
| | | | | | | 106/1.22 |
| 8,619,203 | B2 | * | 12/2013 | Im | ......................... | G06F 3/0412 |
| | | | | | | 345/173 |
| 2011/0134050 | A1 | * | 6/2011 | Harley | .......................... | 345/173 |
| 2012/0162106 | A1 | * | 6/2012 | Choi et al. | .................... | 345/173 |

FOREIGN PATENT DOCUMENTS

TW M397556 2/2011

* cited by examiner

*Primary Examiner* — Afroza Chowdhury
(74) *Attorney, Agent, or Firm* — Paul David Bendemire

(57) ABSTRACT

A touch panel and a method of manufacturing the same are provided. The touch panel comprises: a cover substrate comprising a visible area and a non-visible area, wherein the non-visible area is located in a peripheral area of the visible area; an electrode layer formed on the visible area and the non-visible area of the cover substrate; a conductive masking layer formed on the non-visible area and disposed on a part of the electrode layer that is located on the non-visible area; and a plurality of connecting wires formed on the conductive masking layer and electrically connected to the electrode layer through uniaxial conduction of the conductive masking layer. The present disclosure comprises a method of manufacturing the touch panel. Accordingly, product yield is increased and touch sensing precision is maintained.

18 Claims, 6 Drawing Sheets

TOUCH PANEL AND A MANUFACTURING METHOD THEREOF

BACKGROUND OF THE INVENTION

This Application claims the benefit of the People's Republic of China Application No. 201110455536.9, filed on Dec. 24, 2012.

FIELD OF THE INVENTION

The present disclosure relates to a touch technology, and more particularly to a touch panel and a method of manufacturing the same.

DESCRIPTION OF THE RELATED ART

In recent years, touch panels are widely being used in diversified electronic products as human interfaces for information inputting and operational controlling by sensing finger or stylus touch.

Surface area of a touch panel is normally categorized into a non-visible area and a visible area. In general, the non-visible area is located around the visible area, and normally employs a black material for shading purpose so as to avoid users seeing components such as wires correspondingly disposed in the non-visible area during operation. Accordingly, the visible area viewed by users is an area for practical touch operation, and the non-visible area is a black border located around the visible area.

A known manufacturing process of the touch panel designs a masking layer and an electrode layer on a same substrate comprises the steps of: firstly forming a masking layer on a non-visible area of a substrate, and then forming an electrode layer, wherein covering scope of the formed electrode layer includes a visible area of the substrate and the masking layer. However, due to the electrode layer is normally formed at a high-temperature and high-pressured environment, the masking layer that is formed earlier produces volatile material into the electrode layer during the step of forming the electrode layer, thereby reducing transparency of the electrode layer and changing resistance of the electrode layer.

Accordingly, transparency problem of the electrode layer affects the appearance of the touch panel, and changed resistance of the electrode layer impacts touch sensing precision.

SUMMARY OF THE INVENTION

In view of this, the present disclosure provides a touch panel and a method of manufacturing the same, which changes internal structure, process sequence, and an used masking layer of the touch panel to solve the problem of the appearance of the touch panel caused by bad transparency of the electrode layer and the problem of touch sensing precision impacted by the changed resistance.

The present disclosure provides a touch panel, which comprises: a cover substrate comprising a visible area and a non-visible area, wherein the non-visible area is located in a peripheral area of the visible area; an electrode layer formed on the visible area and the non-visible area of the cover substrate; a conductive masking layer formed on the non-visible area and disposed on a part of the electrode layer that is located on the non-visible area; and a plurality of connecting wires formed on the conductive masking layer and that are electrically connected to a plurality of sensing electrodes of the electrode layer through uniaxial conduction of the conductive masking layer.

The present disclosure further provides a method of manufacturing the same, which comprises steps of: forming an electrode layer on a visible area and a non-visible area of a cover substrate, wherein the non-visible area is located in a peripheral area of the visible area; forming a conductive masking layer on the non-visible area to dispose the conductive masking layer on a part of the electrode layer that is located on the non-visible area; and forming a plurality of connecting wires on the conductive masking layer, wherein the conducting wires are electrically connected to a plurality of sensing electrodes of the electrode layer through uniaxial conduction of the conductive masking layer.

Accordingly, the electrode layer of the present disclosure formed earlier than the conductive masking layer, it avoids the conductive masking layer producing volatile material caused by the high-temperature and high pressured process of the electrode layer to impact resistance and transparency of the electrode layer, and maintains touch sensing precision.

DETAILED DESCRIPTION OF THE EMBODIMENTS

In order to further understand the present disclosure for those skills in the art, several preferable embodiments accompanied with drawings are described in detail below for illustrating the content and desired effect of the present disclosure.

Figure 1:
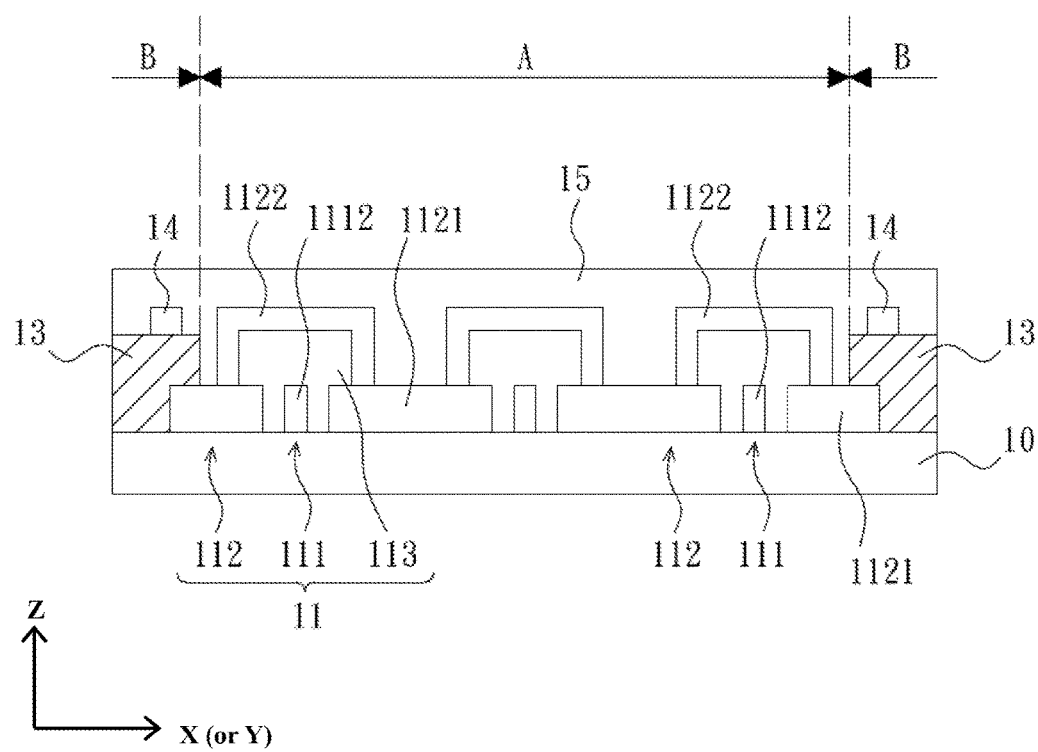
FIG. 1 is a section view diagram of a touch panel in accordance with an embodiment of the present disclosure.

FIG. 1 is a section view diagram of a touch panel in accordance with an embodiment of the present disclosure. As shown in FIG. 1, the touch panel of this embodiment comprises: a cover substrate 10, an electrode layer 11, a conductive masking layer 13, and a plurality of connecting wires 14. In practice, the touch panel of this embodiment can be directly laminated to the display device (not shown), so that the cover substrate 10 can be used as a substrate for carrying the electrode layer 11, but also as a substrate for protection. In other words, the cover substrate 10 can be processed by strengthening anti-bacteria and anti-glare.

The cover substrate 10 comprises a visible area A and a non-visible area B, wherein the non-visible area B is located in a peripheral area of the visible area A. The electrode layer 11 is formed on the visible area A and the non-visible area B of the cover substrate. The conductive masking layer 13 is formed on the non-visible area B and disposed on a part of the electrode layer 11, which is located on the non-visible area B. Lastly, the connecting wires 14 are formed on the conductive masking layer 13, and are electrically connected to the electrode layer 11 through uniaxial conduction of the conductive masking layer 13.

The electrode layer 11 further comprises a plurality of first sensing electrodes 111, which are aligned along a first axis, such as X axis and a plurality of second sensing electrodes 112, which are aligned along a second axis, such as Y axis. The first sensing electrodes 111 and the second sensing electrodes 112 are interlaced with each other. More particularly, each of the first sensing electrodes 111 comprises a plurality of first conductive units (not shown) and a plurality of first conductive wires 1112 connecting two adjacent first conductive units on the first axis, each of the second sensing electrodes 112 comprises a plurality of second conductive units 1121 and a plurality of second conductive wires 1122 connecting two adjacent second conductive units 1121 on the second axis, and each of first conductive wires 1112 and each of second conductive wires 1122 are interlaced with each other.

Furthermore, the electrode layer 11 further comprises a plurality of insulating blocks 113 correspondingly disposed between each of the first sensing electrodes 111 and each of the second sensing electrodes 112, namely correspondingly disposed between the first conductive wires 1112 and the second conductive wires 1122, so that the first sensing electrodes 111 and the second sensing electrodes 112 are insulated from each other.

Moreover, the touch panel of the present disclosure further comprises a passivation layer 15 disposed on the electrode layer 11, the conductive masking layer 13, and the connecting wires 14 for protecting the electrode layer 11, the conductive masking layer 13, and the connecting wires 14 from damage caused by chemical effect such as oxidation or physical effect such as outside force.

In an embodiment, the conductive masking layer 13 of the present disclosure is made of an opaque material such as black material having evenly distributed conductive particles such as Aurum (Au), and designed only for allowing electrical characteristics by uniaxial conduction. If defined with the first axis (X axis) and the second axis (Y axis) of this embodiment, uniaxial conduction of the conductive masking layer 13 is Z axial conduction. Accordingly, the conductive masking layer 13 of this embodiment has an opaque shading effect for covering the connecting wires 14 and components that designed later on the non-visible area B, also makes each first sensing electrode 111 and second sensing electrode 112 electrically connecting to the corresponding connecting wire 14 through the conductive masking layer 13 without conduction with each other. More particularly, the conductive masking layer 13 can be designed with an anisotropic conductive adhesive.

In order to further explain structure and manufacturing process of the touch panel of the present disclosure, with reference to FIG. 2A to FIG. 2E based on a sectional structure of FIG. 1, FIG. 2A to FIG. 2E illustrate schematic view diagrams of each forming phase of a touch panel in accordance with an embodiment of the present disclosure.

Figure 2A:
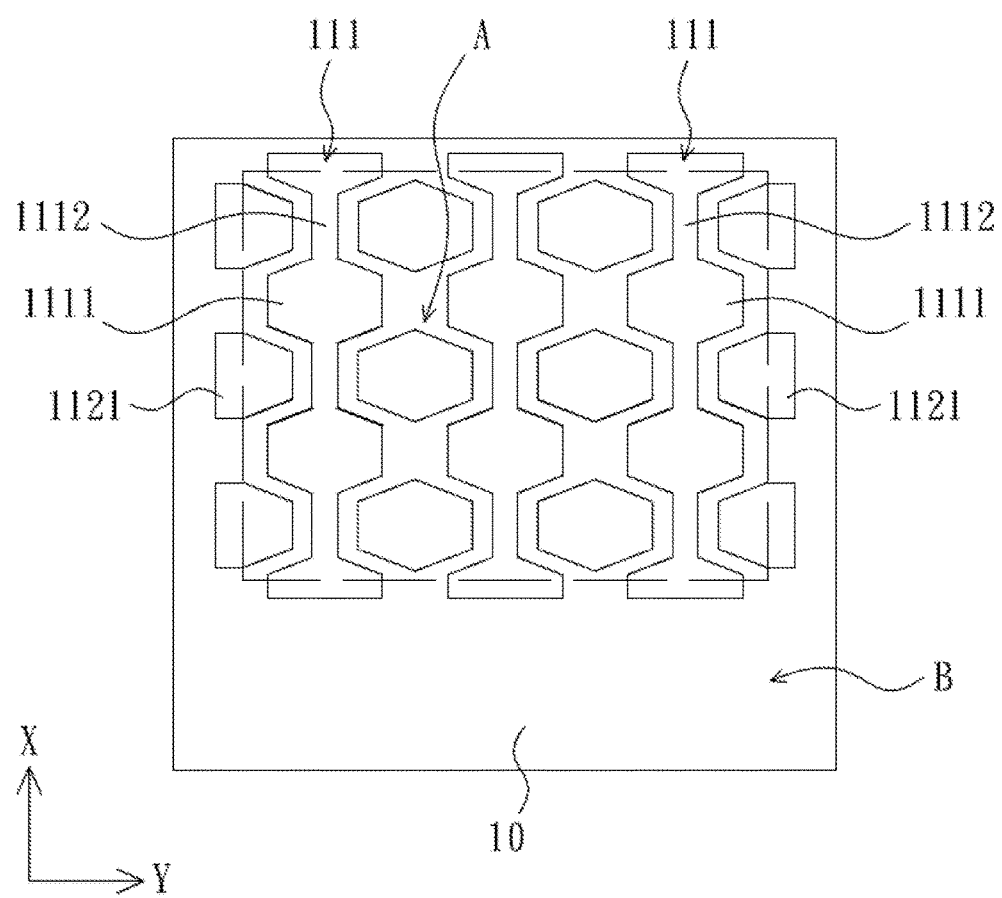
FIG. 2A to FIG. 2E are schematic view diagrams of each forming phase of a touch panel in accordance with an embodiment of the present disclosure.

As shown in FIG. 2A, a conductive material layer made of a transparent material such as Indium Tin Oxide (ITO) is firstly coated on the cover substrate 10. Then, the conductive material layer is patterned to form a plurality of first conductive units 1111, a plurality of first conductive wires 1112, and a plurality of second conductive units 1121, wherein the first conductive units 1111 and the second conductive units 1121 are aligned in an array, and the first conducting wires 1112 connect two adjacent first conductive units 1111 on the first axis, so that all of the first conductive units 1111 and the first conducting wires 1112 that are connected in series on each first axis form a first sensing electrode 111.

Figure 2B:
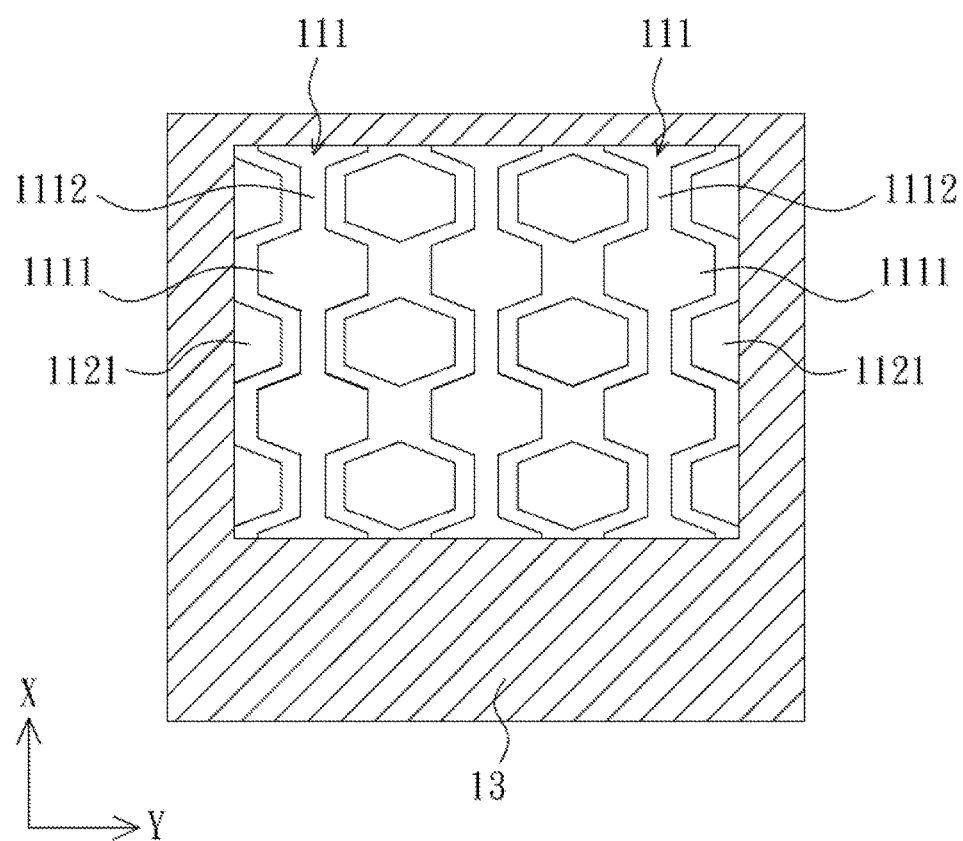

As shown in FIG. 2B, a conductive masking layer 13 is formed on a non-visible area B and disposed on a part of a electrode layer 11 that is located on the non-visible area B, wherein the conductive masking layer 13 can be the non-visible area B formed on the cover substrate 10 by processes such as, but not limited to, printing, spin-coating, rolling or spraying.

Figure 2C:
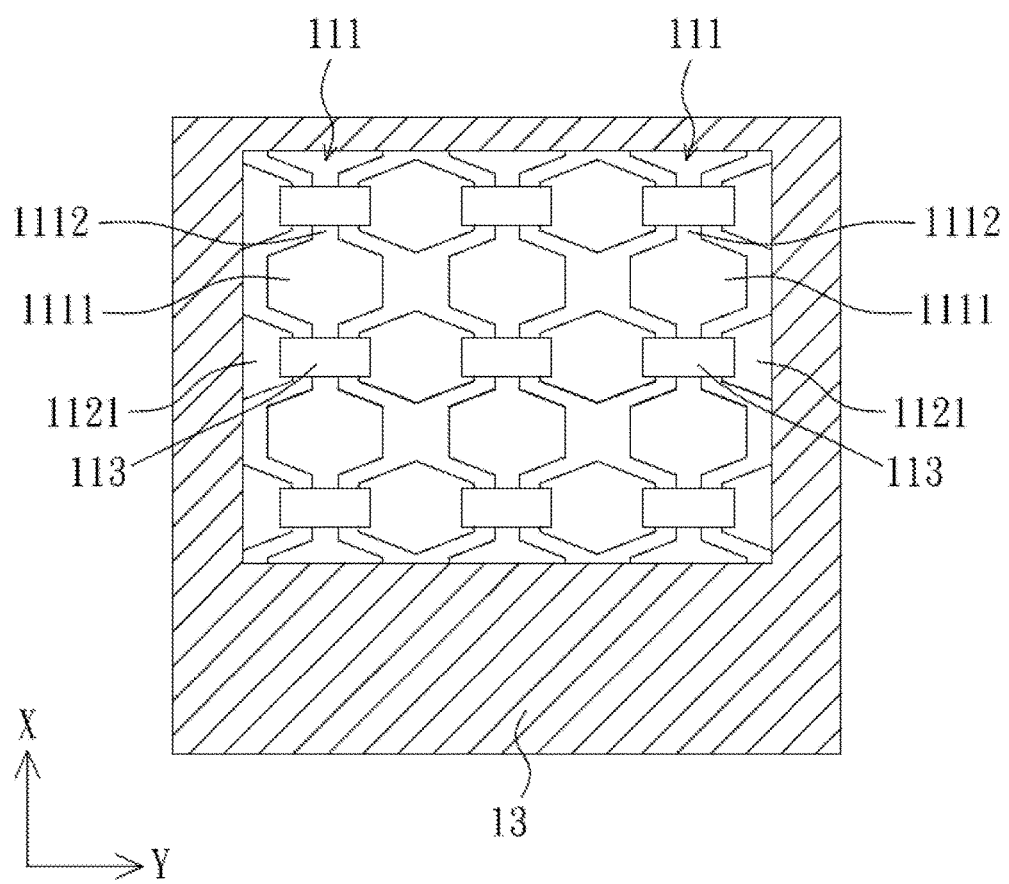

As shown in FIG. 2C, a plurality of insulating blocks 113 are formed to correspondingly dispose on the first conducting wires 1112, wherein the insulating blocks 113 are made of a transparent insulating material.

Figure 2D:
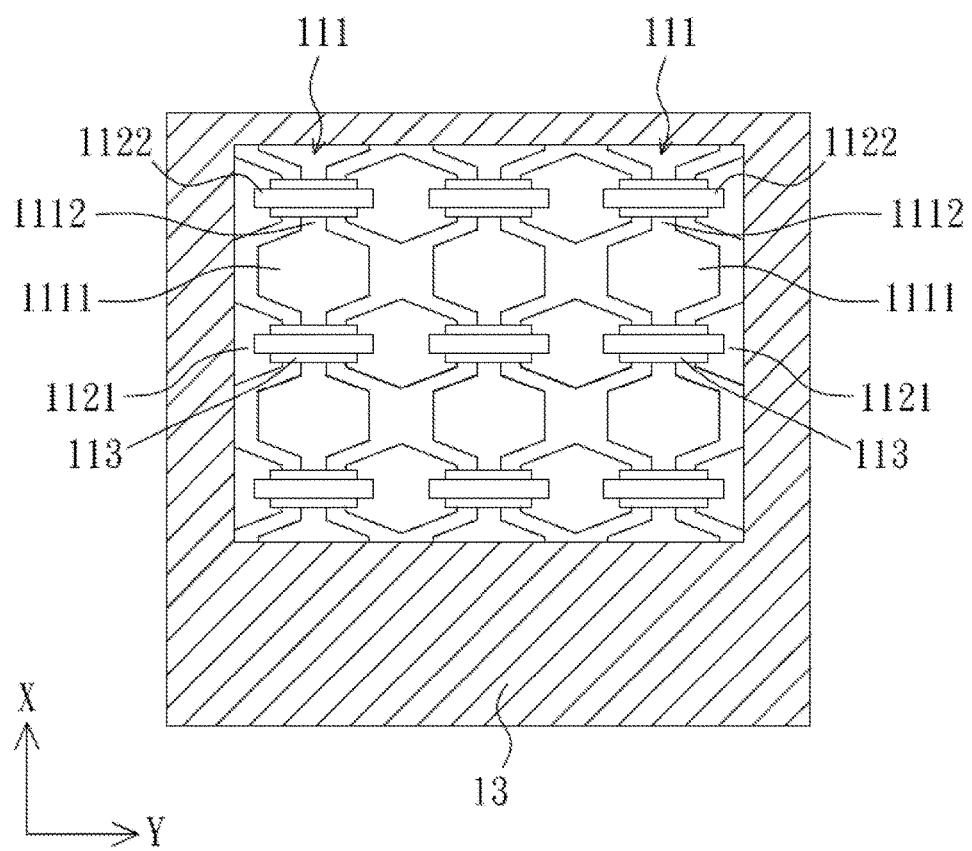

As shown in FIG. 2D, a plurality of second conducting wires 1122 are formed to correspondingly dispose on the insulating blocks 113 for connecting two adjacent second conductive units 1121 on the second axis. Accordingly, all of the second conductive units 1121 and the second conducting wires 1122 that are connected in series on each second axis form a second sensing electrode 112.

Figure 2E:
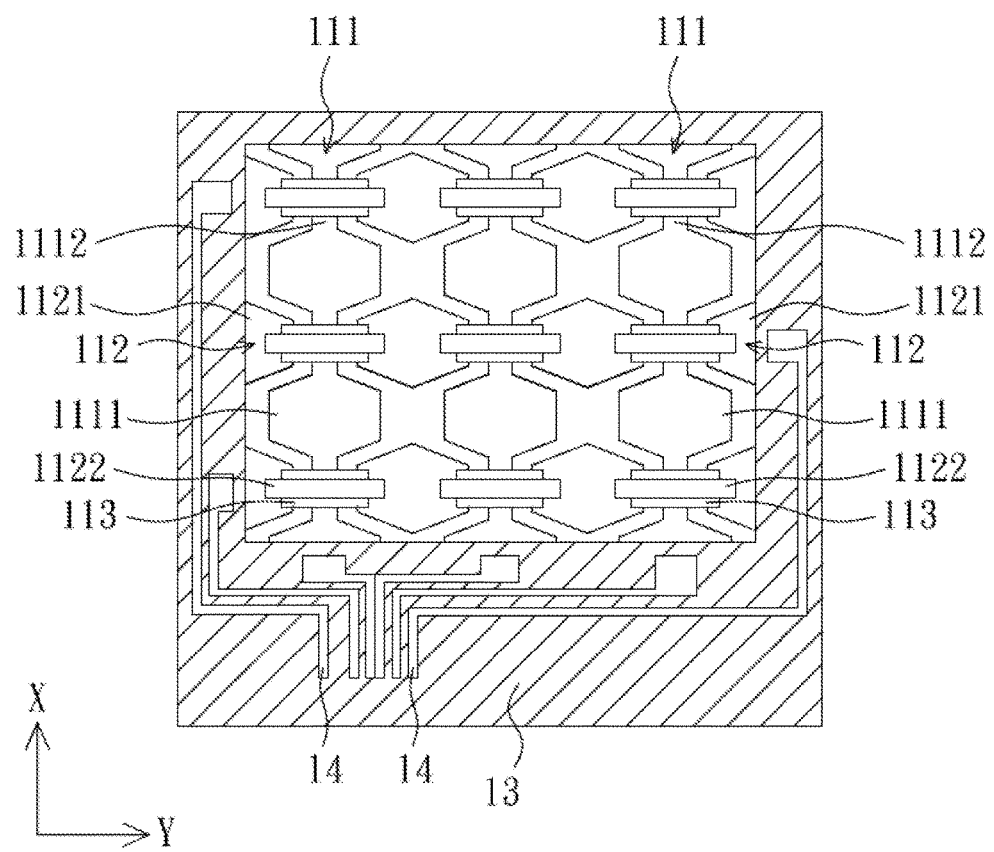

As shown in FIG. 2E, a plurality of connecting wires 14 are formed on the conductive masking, layer 13, wherein the connecting wires 14 are electrically connected to the corresponding first sensing electrodes 111 and the corresponding second sensing electrodes 112 of the electrode layer 11 through uniaxial conduction of the conductive masking layer 13. In an embodiment, if the second conducting wires 1122 of the present disclosure are made of the same metal material as of the connecting wires 14, the second conducting wires 1122 formed in FIG. 2D and the connecting wires 14 formed in FIG. 2E can be designed in a same manufacturing process in a single step.

In another embodiment of the present disclosure, second conductive wires 1122 can be made of same material as of conductive material layer, such as of ITO. Therefore, manufacturing process of a touch panel is not limited by the sequence of the foregoing FIG. 2B to FIG. 2D, which forms the first sensing electrodes 111, the insulating blocks 113, and the second sensing electrodes 112 to dispose a complete electrode layer 11 on a visible area A and a non-visible area B of a cover substrate 10 first and then form a conductive masking layer 13 and connecting wires 14 in sequence.

Lastly, a passivation layer 15 is formed on the electrode layer 11, the conductive masking layer 13, and the connecting wires 14 to avoid the electrode layer 11, the conductive masking layer 13, and the connecting wires 14 damaging by chemical or physical effect. Accordingly, those skills in that art can easily accomplish the touch panel according, to the description of the foregoing phases.

In conclusion, the present disclosure changes internal structure, process sequence, and the used masking layer of the touch panel. Considering the touch panel which the masking layer and the electrode layer are designed on a same substrate, since the present disclosure forms the conductive masking layer on the non-visible area and disposes the conductive masking layer on a part of the electrode layer located on the non-visible area, after forming the electrode layer on the cover substrate. The electrode layer is formed earlier than the conductive masking layer, and the electrode layer can be formed on a same level surface of the cover substrate without height difference, thereby avoiding the conductive masking layer producing volatile material caused by the high-temperature and high pressured process of the electrode layer to impact resistance and transparency of the electrode layer. Accordingly, the present disclosure efficiently increases product yield of the touch panel and maintains touch sensing precision.

Although the disclosure has been described with reference to the foregoing embodiments, it is apparent to those skills in the art that modifications, omissions and alternations to the described embodiments may be made without departing from the spirit of the disclosure. Accordingly, the scope of the disclosure is defined by the attached claims not by the foregoing detailed descriptions.

What is claimed is:

1. A touch panel, comprising:
   a cover substrate comprising a central area and a peripheral area surrounding the central area;
   an electrode layer formed on the central area as well as the peripheral area of the cover substrate, wherein the electrode layer comprises a plurality of first sensing electrodes aligned along a first axis and a plurality of second sensing electrodes aligned along a second axis;
   a uniaxially-conductive masking layer formed on the peripheral area in a manner such that the uniaxially-conductive masking layer is disposed on a part of the electrode layer located on the peripheral area, wherein the uniaxially-conductive masking layer is in physical contact with a sidewall of one or more of the second sensing electrodes in the peripheral area, and wherein the uniaxially-conductive masking layer facilitates a uniaxial conduction along a third axis perpendicular to a surface of the cover substrate along which the first axis and the second axis extend; and
   a plurality of connecting wires formed on the uniaxially-conductive masking layer on the peripheral area without being in physical contact with the electrode layer such that the connecting wires are electrically connected to the part of the electrode layer located on the peripheral area by virtue of the uniaxial conduction of the uniaxially-conductive masking layer along the third axis.

2. The touch panel of claim 1, wherein the first sensing electrodes and the second sensing electrodes are insulated from each other.

3. The touch panel of claim 1, wherein each of the first sensing electrodes comprises a plurality of first conductive units and a plurality of first conductive wires connecting two adjacent first conductive units on the first axis, wherein each of the second sensing electrodes comprises a plurality of second conductive units and a plurality of second conductive wires connecting two adjacent second conductive units on the second axis, and wherein the first conductive wires and the second conductive wires are interlaced with each other.

4. The touch panel of claim 3, wherein the electrode layer comprises a plurality of insulating blocks correspondingly disposed between each of the first conductive wires and each of the second conductive wires.

5. The touch panel of claim 2, wherein each of the second sensing electrodes has at least one end covered by the uniaxially-conductive masking layer, and wherein the covered end is aligned to one end of a corresponding connecting wire along the third axis.

6. The touch panel of claim 1, further comprising a passivation layer disposed on the electrode layer, the uniaxially-conductive masking layer, and the connecting wires.

7. The touch panel of claim 1, wherein the uniaxially-conductive masking layer is made of an opaque material having evenly distributed conductive particles.

8. The touch panel of claim 1, wherein the uniaxially-conductive masking layer is designed with an anisotropic conductive adhesive.

9. The touch panel of claim 1, wherein the uniaxially-conductive masking layer is made of an opaque material to cover the connecting wires from being seen.

10. The touch panel of claim 1, wherein the uniaxially-conductive masking layer is in physical contact with a top surface of the cover substrate and a top surface of the one or more of the second sensing electrodes.

11. A method of manufacturing a touch panel comprising the steps of;
    forming an electrode layer on a central area and a peripheral area of a cover substrate, wherein the peripheral area surrounds the central area, and wherein the central area is a visible area of the cover substrate and the peripheral area is a non-visible area of the cover substrate, and wherein the electrode layer comprises a plurality of first sensing electrodes aligned along a first axis and a plurality of second sensing electrodes aligned along a second axis;
    forming a uniaxially-conductive masking layer on the peripheral area to directly contact the cover substrate and to dispose the uniaxially-conductive masking layer on a part of the electrode layer located on the peripheral area, wherein the uniaxially-conductive masking layer is in physical contact with a sidewall of one or more second sensing electrodes of the electrode layer in the peripheral area, and wherein the uniaxially-conductive masking layer facilitates a uniaxial conduction along a third axis perpendicular to a surface of the cover substrate along which the first axis and the second axis extend; and
    forming a plurality of connecting wires on the uniaxially-conductive masking layer on the peripheral area without being in physical contact with the electrode layer, such that the connecting wires are electrically connected to the part of the electrode layer located on the peripheral area by virtue of the uniaxial conduction of the uniaxially-conductive masking layer along the third axis.

12. The method of manufacturing the touch panel of claim 11, wherein the step of forming the electrode layer further comprises:
    coating a conductive material layer on the cover substrate;
    patterning the conductive material layer to form a plurality of first conductive units, a plurality of first conductive wires, and a plurality of second conductive units, wherein the first conductive units and the second conductive units are aligned in an array, and wherein each of the first conductive wires connects two adjacent first conductive units on the first axis;
    forming a plurality of insulating blocks to correspondingly dispose on the first conductive wires; and
    forming a plurality of second conductive wires to correspondingly dispose on the insulating blocks for respectively connecting two adjacent second conductive units on the second axis.

13. The method of manufacturing the touch panel of claim 12, wherein the second conductive wires and the connecting wires are formed by a same manufacturing process.

14. The method of manufacturing the touch panel of claim 12, wherein the first conductive wires and the first conductive units constitute the first sensing electrodes.

15. The method of manufacturing the touch panel of claim 12, wherein the second conductive wires and the second conductive units constitute the second sensing electrodes, and wherein each of the second sensing electrodes has at least one end covered by the uniaxially-conductive masking layer in the step of forming a uniaxially-conductive masking layer, and wherein the covered end is aligned to one end of a corresponding connecting wire along the third axis in the step of forming a plurality of connecting wires.

16. The method of manufacturing the touch panel of claim 11, further comprising:
   forming a passivation layer on the electrode layer, the uniaxially-conductive masking layer, and the connecting wires.

17. The method of manufacturing the touch panel of claim 11, wherein the step of forming the uniaxially-conductive masking layer utilizes technologies of at least one of printing, spin-coating, rolling or spraying.

18. The method of manufacturing the touch panel of claim 11, wherein the uniaxially-conductive masking layer is designed with an anisotropic conductive adhesive.

* * * * *